United States Patent [19]

Kobayashi et al.

[11] Patent Number: 5,739,222
[45] Date of Patent: Apr. 14, 1998

[54] PROCESS FOR PREPARING VINYL CHLORIDE POLYMER UNDER SPECIFIED VAPOR PRESSURE

[75] Inventors: Takashi Kobayashi; Tadashi Amano; Yoshitaka Okuno; Hideshi Kurihara; Tadaaki Kurokawa, all of Ibaraki-ken, Japan

[73] Assignee: Shin-Etsu Chemical Co., Ltd., Tokyo, Japan

[21] Appl. No.: 672,448

[22] Filed: Jun. 28, 1996

[30] Foreign Application Priority Data

Jul. 5, 1995 [JP] Japan .................... 7-192431
Oct. 4, 1995 [JP] Japan .................... 7-282604

[51] Int. Cl.$^6$ .................... C08F 2/20; C08F 4/38
[52] U.S. Cl. .................... 526/87; 526/79; 526/202; 526/228
[58] Field of Search .................... 526/78, 79, 80, 526/227, 228

[56] References Cited

U.S. PATENT DOCUMENTS

| | | | |
|---|---|---|---|
| 3,451,985 | 6/1969 | Mahlo. | |
| 4,914,169 | 4/1990 | Suyama | 526/228 |
| 5,420,215 | 5/1995 | Amano | 526/74 |

*Primary Examiner*—Christopher Henderson
*Attorney, Agent, or Firm*—McAulay Fisher Nissen Goldberg & Kiel, LLP

[57] ABSTRACT

A vinyl chloride polymer is prepared through suspension polymerization of a vinyl chloride monomer in the presence of a polymerization initiator in a reactor. The reactor is charged with up to 4/5 of the overall monomer charge to initiate polymerization. Polymerization is carried out under a certain saturated vapor pressure of P1 kgf/cm$^2$ at a preset polymerization temperature. When the internal pressure of the reactor declines to P2 kgf/cm$^2$, the remainder of the overall monomer charge is continuously fed to the reactor so as to maintain the internal pressure within the range of (P1−ΔP) wherein ΔP=P1−P2 ranges from 0.1 to 2.0 kgf/cm$^2$. A vinyl chloride polymer having a high degree of polymerization is efficiently produced while alleviating the load of heat removal.

4 Claims, No Drawings

PROCESS FOR PREPARING VINYL CHLORIDE POLYMER UNDER SPECIFIED VAPOR PRESSURE

BACKGROUND OF THE INVENTION

1. Field of the Invention

This invention relates to a process for preparing a vinyl chloride polymer by suspension polymerization and more particularly, to a process for preparing a vinyl chloride polymer in high yields while reducing the load of heat removal.

2. Prior Art

Suspension polymerization of vinyl chloride monomers is generally effected batchwise. A polymerizing reactor or polymerizer equipped with a jacket for passing a cooling medium is charged with water, a suspending agent, a polymerization initiator, a vinyl chloride monomer, and other additives. With stirring, the mixture charged in the reactor is heated to a preset polymerization temperature by passing heating water through the jacket around the reactor. Since the polymerization reaction of vinyl chloride monomers is exothermic, polymerization then proceeds while the reaction heat is removed by passing cooling water through the jacket such that the mixture charged in the reactor may be maintained at the preset temperature. At a point of time when free vinyl chloride monomer is disappearing from the charged mixture as the yield increases, the vinyl chloride monomer in gas phase starts decreasing and the internal pressure of the reactor starts declining. Polymerization reaction is terminated when a predetermined internal pressure is reached.

Generally speaking, in the polymerization of vinyl chloride monomers, the degree of polymerization of a polymer is governed by a preset polymerization temperature. Thus the preset polymerization temperature is automatically determined in accordance with a target degree of polymerization. If the preset polymerization temperature is low, the resulting polymer would have a higher degree of polymerization. For example, the degree of polymerization is about 800 at a preset polymerization temperature of 63° C. but reaches about 2,000 at a preset polymerization temperature of 43° C.

Accordingly, vinyl chloride polymers having a high degree of polymerization will be obtained if the polymerization temperature is set low. This in turn requires a longer polymerization time. The amount of a polymerization initiator added must be increased in order to shorten the polymerization time. The increased amount of a polymerization initiator, in turn, causes the polymerization reaction to generate more heat. To remove the reaction heat, the temperature of cooling water must be set lower, sometimes surpassing the capacity of a water cooling machine. It is then difficult to shorten the polymerization time. The cooling capacity can be increased to provide for heat removal. Even in such a case, if the amount of a polymerization initiator is further increased in order to shorten the polymerization time, then the resulting polymer will have a lower degree of polymerization. Then the polymerization temperature must be set lower, resulting in a lower polymerization rate. This combined with the increased cooling load is disadvantageous. The series of steps are caught in a vicious circle. The increased amount of polymerization initiator gives rise to the additional problem that parts molded from the resulting polymer have a poor color hue.

One known solution to the problem is to add a crosslinking agent to a charge mixture to be polymerized. Although the resulting polymer has an apparently increased degree of polymerization, its mechanical properties such as tensile elongation and tensile strength are not as high as those of a genuine polymer having an identical degree of polymerization.

It is therefore desired to have a process of preparing a polymer having a high degree of polymerization without excessively lowering the preset polymerization temperature as in the prior art. More specifically, if the current preset polymerization temperature can be increased for the purpose of producing a polymer having a desired degree of polymerization, then the rate of polymerization reaction is increased, permitting the polymerization time to be shortened and the amount of polymerization initiator to be reduced. Additionally, the temperature of cooling water to be passed through the jacket can be increased so that the load of a water cooling machine may be reduced, resulting in a cost reduction.

Also in connection with the polymerization of vinyl chloride monomers, a polymerization initiator is selected from those commonly used at a certain polymerization temperature. If a target yield and polymerization time are given, the necessary amount of that initiator is automatically determined.

In order to prepare vinyl chloride polymers at a high productivity, it is increasingly demanded to complete the polymerization process within a short time. Under such circumstances, it has been a common practice to select a more active polymerization initiator and increase the amount thereof. As the amount of initiator used is increased, the resulting polymer has a more amount of undecomposed initiator carried thereon, which is detrimental to the color hue of parts molded from the polymer. The increased amount of initiator, in turn, causes the polymerization reaction to generate more heat per unit time. To remove the reaction heat, the temperature of cooling water passed through the jacket around the reactor must be lower, sometimes surpassing the capacity of a water cooling machine. Increasing the capacity of a cooling machine leads to an increased cost. In addition, the increased amount of initiator results in a polymer having a lower degree of polymerization. To increase a degree of polymerization, the polymerization temperature must be set lower, resulting in a lower polymerization rate. This combined with the increased cooling toad is caught in a vicious circle.

For solving the problem, it is effective to make uniform the pattern of removal of polymerization heat, that is, to establish a uniform polymerization rate. In Japanese Patent Application Kokai (JP-A) Nos. 14670/1971, 149407/1981, and 105709/1993, for example, it was proposed to combine two or more initiators having different activities. This approach is successful in reducing the amount of initiator required to complete polymerization within an identical time because the reaction rate pattern is converted from a rightward rising triangle to a rectangle to increase an average reaction rate throughout the process. Since this reduction of the amount of initiator required is insufficient, there is a need for a further reduction.

Therefore, a primary object of the invention is to provide a process for preparing a vinyl chloride polymer having a high degree of polymerization at a high productivity while reducing the load of heat removal.

Another object of the invention is to provide a process for preparing a vinyl chloride polymer having a high degree of polymerization and improved colorability upon molding at a high productivity while significantly reducing the necessary amount of initiator and the load of heat removal.

SUMMARY OF THE INVENTION

In conjunction with ordinary batchwise polymerization of a vinyl chloride monomer, there occurs a well-known phenomenon that at a point of time when free vinyl chloride monomer is disappearing from the charge mixture as the yield increases and the rate of polymerization reaction gradually increases, the vinyl chloride monomer in gas phase starts decreasing and the internal pressure of the reactor starts declining, and the rate of polymerization reaction reaches maximum at this point of pressure decline or some time later and thereafter experiences a sudden drop. When the rate of polymerization reaction reaches maximum or nearly maximum at the start of decline of the reactor internal pressure or some time later, the vinyl chloride monomer is added in an additional amount corresponding to the consumption of the vinyl chloride monomer at that rate of polymerization reaction so that the internal pressure of the reactor is maintained substantially at or in proximity to a level enough to ensure the maximum rate of polymerization reaction. Then polymerization reaction proceeds in such a state that this nearly maximum rate of polymerization reaction may be maintained for a relatively long period of time. This is very advantageous for increased productivity. Also, surprisingly, if the amount of the vinyl chloride monomer added in this state is increased to increase the ratio of the additional monomer to the initially charged monomer to such an extent that the additional monomer is at least one fifth of the overall monomer charge, then a vinyl chloride polymer having a high degree of polymerization can be produced.

Therefore, the present invention provides a process for preparing a vinyl chloride polymer by suspension polymerization of a vinyl chloride monomer in a reactor wherein at the instant when the internal pressure of the reactor starts declining in a later stage of polymerization reaction approximately on arrival at maximum of the rate of polymerization reaction or some time later, an additional amount of the vinyl chloride monomer is added whereby a nearly maximum rate of polymerization reaction is maintained for a relatively long period of time, thereby obtaining a polymer having a higher degree of polymerization. More specifically, the reactor is first charged with up to ⅘ of the overall monomer charge, and the remaining at least ⅕ of the overall monomer charge is fed to the reactor after the internal pressure of the reactor has started declining.

We have also found that better results are obtained by charging the reactor with up to ⅘ of the overall monomer charge and carrying out polymerization under a certain saturated vapor pressure of P1 kgf/cm² at a preset polymerization temperature. When the internal pressure of the reactor declines to P2 kgf/cm², the remainder of the overall monomer charge is continuously fed to the reactor so as to maintain the internal pressure within the range of (P1−ΔP) wherein ΔP=P1−P2 ranges from 0.1 to 2.0 kgf/cm², preferably 0.1 to 1.0 kgf/cm².

We have further found that better results are obtained when a polymerization initiator having a temperature of 30° to 65° C. at which its half life in a 0.1 mol/l benzene solution is 10 hours is used in an amount of 0.01 to 0.3% by weight based on the weight of the overall monomer charge. The polymerization initiator used herein is preferably a 1,1,2,2-tetramethylpropylperoxy ester of the following general formula:

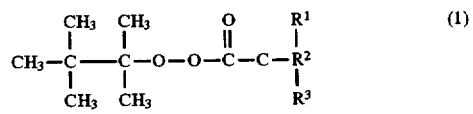

wherein $R^1$, $R^2$ and $R^3$ are independently selected from normal alkyl groups having 1 to 9 carbon atoms. When suspension polymerization of a vinyl chloride monomer is carried out in the presence of a 1,1,2,2-tetramethylpropylperoxy ester of formula (1) as the polymerization initiator, the vinyl chloride monomer in gas phase starts decreasing and the internal pressure of the reactor starts declining at a point of time when free vinyl chloride monomer is disappearing from the charged mixture. The rate of polymerization reaction rapidly increases from a point of time about 10 to 20 minutes before the start of decline of the internal pressure and a maximum rate of polymerization reaction is reached when the internal pressure declines a little (a decline of about 2 kgf/cm² though it somewhat varies with polymerization conditions). Thereafter, the rate of polymerization reaction is significantly slowed down. This outstanding gel effect is not found with conventional initiators. Based on this discovery, we carried out production of a vinyl chloride polymer.

When the rate of polymerization reaction reaches maximum or nearly maximum due to the outstanding gel effect, the vinyl chloride monomer is added in an additional amount corresponding to the consumption of the vinyl chloride monomer at that rate of polymerization reaction so that the internal pressure of the reactor is maintained substantially at or in proximity to a level enough to ensure the maximum rate of polymerization reaction. Then polymerization reaction proceeds in such a state that this nearly maximum rate of polymerization reaction may be maintained for a relatively long period of time. This procedure permits the initiator to be quite effectively used and advantageously increases productivity. Also, if the amount of the vinyl chloride monomer added in the later stage is increased to increase the ratio of the additional monomer to the initially charged monomer to such an extent that the additional monomer is at least one fifth of the overall monomer charge as previously mentioned, then a vinyl chloride polymer having a high degree of polymerization can be produced. Based on these facts, we have found that when it is desired to produce a polymer having the same degree of polymerization as prior art ones, the polymerization temperature can be set higher, the load of removal of polymerization reaction heat can be alleviated, and the rate of polymerization reaction can be increased. All these factors lead to a favorable cycle in contrast to the prior art. Since the necessary amount of polymerization initiator is significantly reduced, the amount of undecomposed initiator carried on the resulting polymer is reduced, which ensures that parts molded from the polymer are improved in color hue.

Thus we have found that if a 1,1,2,2-tetramethylpropylperoxy ester of formula (1) is used in a reactor for the suspension polymerization of a vinyl chloride monomer as the polymerization initiator in a significantly smaller amount than conventional initiators, and if an additional amount of the vinyl chloride monomer is added at the instant when the internal pressure of the reactor starts declining in a later stage of polymerization reaction approximately on arrival at maximum of the rate of polymerization reaction or some time later, such that the internal pressure of the reactor may fall in the effective range, then a nearly maximum rate of polymerization reaction can be maintained for a relatively long period of time, resulting in a polymer having a higher degree of polymerization. This is ensured when the reactor is first charged with up to ⅘ of the overall monomer charge, and the remaining at least ⅕ of the overall monomer charge is additionally fed in the later stage.

DETAILED DESCRIPTION OF THE INVENTION

Broadly stated, a process for preparing a vinyl chloride polymer by suspension polymerization of a vinyl chloride monomer in the presence of a polymerization initiator in a reactor is contemplated herein. According to the feature of the invention, the reactor is charged with up to ⅘ of the overall monomer charge to initiate polymerization. After the internal pressure of the reactor has started declining, the remainder of the overall monomer charge is fed to the reactor to continue polymerization.

Suspension polymerization of a vinyl chloride monomer may be carried out in a conventional manner. Usually, a reactor equipped with a jacket through which a heating or cooling medium can be passed for heating or cooling the reactor is charged with water, a suspending agent, a vinyl chloride monomer, and a polymerization initiator. Polymerization is then initiated.

The vinyl chloride monomer used herein encompasses vinyl chloride alone and a mixture of a major proportion, typically more than 50% by weight, preferably more than 70% by weight of vinyl chloride and a minor proportion of another monomer copolymerizable therewith. Examples of the monomer copolymerizable with vinyl chloride include alpha-olefins such as ethylene, propylene, 1-butene, 1-pentene, 1-hexene, 1-heptene, 1-octene, 1-nonene, 1-decene, 1-undecene, 1-dodecene, 1-tridecene, and 1-tetradecene; vinyl esters such as vinyl acetate; vinyl ethers such as lauryl vinyl ether and isobutyl vinyl ether; maleic acid and maleic anhydride; and vinylidene chloride, alone or in admixture of two or more.

The initial amount of the vinyl chloride monomer charged is up to four fifths, preferably up to two thirds of the overall monomer charge, which is an initial amount of monomer added first plus an additional amount of monomer added later. If the initial charge of the vinyl chloride monomer loaded exceeds ⅘ of the overall monomer charge, then the additional amount of monomer added later is reduced to less than ⅕ of the overall monomer charge. Then the length of time when a nearly maximum rate of polymerization can be maintained is reduced and the degree of polymerization cannot be fully increased, failing to achieve the objects of the invention. If the initial charge of the vinyl chloride monomer is too small, then the absolute quantity of polymerization reaction at the point of time when the additional monomer is fed is reduced, which is detrimental to productivity. For this reason, the initial charge of the vinyl chloride monomer is preferably at least ⅒, especially at least ⅕ of the overall monomer charge.

The suspending agent used for suspension polymerization according to the invention may be selected from those conventionally used in polymerization of vinyl chloride monomers, for example, cellulose derivatives such as methyl cellulose, hydroxyethyl cellulose, hydroxypropyl cellulose, and hydroxypropylmethyl cellulose, water or oil-soluble partially saponified polyvinyl alcohol, and water-soluble polymers such as acrylic acid polymers and gelatin. They may be used alone or in admixture of two or more. In combination with the suspending agent, there can be used any of nonionic emulsifiers such as sorbitan monolaurate, sorbitan trilaurate, glycerin tristearate, and ethylene oxide-propylene oxide block copolymers and anionic emulsifiers such as polyoxyethylene sorbitan monolaurate, polyoxyethylene glycerin oleate, and sodium lauryl sulfate. The suspending agent is preferably added in an amount of about 0.02 to 0.2 part by weight per 100 parts by weight of the overall vinyl chloride monomer charge.

Useful polymerization initiators are those which are effective in the temperature range of 30° to 70° C. which is an ordinary polymerization temperature range of vinyl chloride monomers, that is, polymerization initiators having a temperature of 30° to 65° C. at which its half life in a 0.1 mol/l benzene solution is 10 hours. These polymerization initiators may be used alone while a mixture of two or more polymerization initiators having different 10-hour half-life temperatures may be used for the purpose of providing a constant rate of polymerization reaction until the internal pressure of the reactor starts declining. Examples of the polymerization initiator include diacyl organic peroxides such as isobutyrylperoxide (10-hour half-life temperature 32.5° C.), 3,5,5-trimethylhexanoylperoxide (59.5° C.), and lauroylperoxide (62.0° C.); peroxyester organic peroxides such as cumylperoxyneodecanoate (36.5° C.), tert-butylperoxypivalate (55.0° C.), tert-butylperoxyneoheptanoate (49.7° C.), tert-butylperoxyneodecanoate (46.5° C.), and t-hexylperoxyneodecanoate (44.7° C.); peroxydicarbonate organic peroxides such as diallylperoxydicarbonate (38.87C), di-sec-butylperoxydicarbonate (45.0° C.), and di-2-ethylhexylperoxydicarbonate (43.5° C.); and azo compounds such as 2,2'-azobisisobutyronitrile (65.0° C.) and 2,2'-azobis-2,4-dimethylvaleronitrile (51.0° C.).

Preferred polymerization initiators are 1,1,2,2-tetramethylpropylperoxy esters of the following general formula:

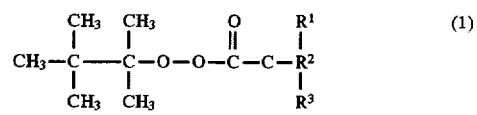

wherein $R^1$, $R^2$ and $R^3$, which may be the same or different, are independently selected from normal alkyl groups having 1 to 9 carbon atoms.

Preferred examples of the ester of formula (1) which can be used herein include 1,1,2,2-tetramethylpropylperoxyneodecanoate (10-hour half-life temperature in 0.1 mol/l benzene solution: 39.0° C.), 1,1,2,2-tetramethylpropylperoxypivalate (45.7° C.), and 1,1,2,2-tetramethylpropylperoxyneoheptanoate (40.6° C.).

The polymerization initiator is preferably added to the polymerization system in an amount of 0.01 to 0.3% by weight, more preferably 0.03 to 0.2% by weight of the overall charge of vinyl chloride monomer. With less than 0.01% of the polymerization initiator, there is a likelihood that the system fails to sustain activity enough for polymerization reaction to proceed, polymerization reaction peaks before the internal pressure of the reactor starts declining, polymerization reaction declines thereafter, there is no chance to add an additional amount of the vinyl chloride monomer in the vicinity of the maximum rate of polymerization reaction, and the polymerization time is prolonged. With more than 0.3% of the polymerization initiator, the rate of polymerization reaction would become so high that the resultant large amount of heat of polymerization cannot be fully removed before the maximum rate of polymerization reaction is reached, inducing runaway reaction.

It is understood that the preferred polymerization initiator is a 1,1,2,2-tetramethylpropylperoxyester compound of formula (1) as mentioned above. It may be used alone or in combination with at least one of other polymerization initiators having a 10-hour half-life temperature in 0.1 mol/l benzene solution of 30° to 60° C. In the latter case, the 1,1,2,2-tetramethylpropylperoxyester compound of formula (1) is desirably Used in an amount of at least ⅓, especially at least ½ of the total amount of polymerization initiators. If the amount of 1,1,2,2-tetramethylpropylproxyester compound of formula (1) used is less than ⅓ of the total amount of polymerization initiators, then there would not occur the outstanding gel effect inherent to that compound that the rate of polymerization reaction experiences a rapid leap nearly when the internal pressure of the reactor starts declining. This is against the feature of the invention that polymerization is continued with a smaller amount of initiator and at a high rate of polymerization reaction while adding an additional amount of the vinyl chloride monomer.

Often the entire amount of the polymerization initiator is added at the initial stage although a portion of the polymerization initiator may be continuously or intermittently added during polymerization. Since the point of time when an additional amount of the vinyl chloride monomer is added is critical in the polymerization process of the invention and it is desirable to shorten the length of time passed until the internal pressure of the reactor starts declining, it is recommended to use the polymerization initiator in an amount of at least 0.04%, especially at least 0.06% by weight of the initial monomer charge.

The polymerization initiator may be added to the reaction system in any desired manner, for example, by pumping.

As is conventional, any of optional polymerization aids commonly used in the polymerization of vinyl chloride monomers including a polymerization regulator, chain transfer agent, pH adjusting agent, gelation adjusting agent, anti-static agent, crosslinking agent, filler, and polymer scale inhibitor may be added if necessary.

After the reactor is charged with the reactants, the charge mixture in the reactor is heated by passing a heating medium (typically hot water) through the jacket, thereby initiating polymerization. Once the charge mixture reaches the preset polymerization temperature, heat of polymerization is removed by passing a cooling medium through the jacket, thereby maintaining the preset polymerization temperature. The preset polymerization temperature may be properly selected although a temperature in the range of 30° to 70° C., especially 35° to 65° C. is preferred from the standpoints of a rate of reaction and a degree of polymerization.

While polymerization proceeds in this way, the yield increases and the rate of reaction gradually increases. At a point of time when free vinyl chloride monomer is disappearing from the charge mixture, the vinyl chloride monomer in gas phase starts decreasing and the internal pressure of the reactor starts rapidly dropping. The rate of polymerization reaction rapidly rises from about 10 to 20 minutes before the internal pressure of the reactor starts rapidly dropping, and peaks at a point of time when the internal pressure declines a little (a decline of about 2 kgf/cm² though it somewhat varies with polymerization conditions).

Where the 1,1,2,2-tetramethylpropylperoxyester compound of formula (1) is used as a polymerization initiator, its unique gel effect drives a rapid rise of the rate of polymerization reaction so that the peak rate of polymerization reaction reaches 1.5 times, sometimes 2 or more times the rate before the rise.

At the point of time when the internal pressure of the reactor has declined a little at or in the vicinity of the peak rate of polymerization reaction, the remainder of the overall monomer charge which has not been fed initially, more specifically at least ⅕, especially at least ⅓ of the overall monomer charge is continuously added to the reaction system to continue polymerization.

It is now assumed that the reaction system has a certain saturated vapor pressure P1 kgf/cm² at the initial preset polymerization temperature, that is, the reactor has a certain internal pressure P1 kgf/cm² before the internal pressure starts declining, and that the reactor has an internal pressure P2 kgf/cm² after the internal pressure has started declining, and $\Delta P = P1 - P2$. Supply of an additional amount of the monomer to the reactor is preferably started and continued so as to maintain the internal pressure within the range of (P1−ΔP) wherein $0.1 \text{ kgf/cm}^2 \leq \Delta P \leq 2.0 \text{ kgf/cm}^2$, preferably $0.1 \text{ kgf/cm}^2 \leq \Delta P \leq 1.0 \text{ kgf/cm}^2$. By maintaining ΔP within this range, the rate of polymerization reaction can be maintained maximum or nearly maximum thereafter. If ΔP is outside the range, the rate of polymerization reaction would be lower during supply of the additional vinyl chloride monomer and as a result, the polymerization time would be prolonged, failing to obtain a polymer having a high degree of polymerization. Therefore, by maintaining ΔP within this range, a vinyl chloride polymer having a high degree of polymerization can be produced at high productivity and with the reduced load of heat removal from the reaction system. In order to precisely adjust a degree of polymerization and a polymerization time, it is further preferable that a constant value of ΔP within the above-defined range be maintained. By maintaining ΔP constant, the relationship that the rate of monomer feed is equal to the rate of polymer formation can be maintained.

The vinyl chloride monomer may be supplied to the reactor by various techniques, for example, by pumping or by heating a container of the monomer to create a pressure difference enough to forcibly admit the monomer to the reactor. Any desired technique may be used insofar as it is capable of precise stable supply of the monomer.

After the remainder of the overall monomer charge is completely fed to the reactor, polymerization is terminated in accordance with a conventional polymerization technique.

The process of the invention can produce a vinyl chloride polymer having a high degree of polymerization at a high productivity while reducing the load of heat removal. Where a 1,1,2,2-tetramethylpropylperoxyester compound of formula (1) is used as the polymerization initiator, a vinyl chloride polymer having a high degree of polymerization and improved colorability upon molding can be produced at a high productivity while reducing the necessary amount of initiator and the load of heat removal.

EXAMPLE

Examples of the present invention is described below by way of illustration and not by way of limitation.

Example 1

The reactor used for suspension polymerization of vinyl chloride monomer (VCM) was a stainless steel reactor having an interior volume of 100 liters equipped with a jacket, baffle, and stirrer.

The reactor was charged with 60 kg of deionized water at 22° C. Then 2 kg of an aqueous solution containing 18 grams (0.06% by weight based on the overall vinyl chloride monomer charge) of water-soluble partially saponified polyvinyl alcohol and 12 grams (0.04% by weight based on the overall vinyl chloride monomer charge) of water-soluble cellulose ether and 100 grams of a mixture of water and methanol (in a weight ratio of 1:1) containing 12 grams (0.04% by weight based on the overall vinyl chloride monomer charge) of oil-soluble partially saponified polyvinyl alcohol as suspending agents were admitted into the reactor and stirred. By passing warm water through the jacket, the reactor contents were heated to 30° C. The reactor interior was evacuated to a vacuum of 120 mmHg. With stirring, the reactor was charged with 14.0 kg of vinyl chloride monomer (VCM) at room temperature (19° C.) to form a mixture. The charge mixture was heated to 30° C. by warm water through the jacket. Thereafter, with the mixture being stirred, 38.57 grams of an isoparaffin solution containing 27.0 grams (0.09% by weight based on the overall vinyl chloride monomer charge) of di-2-ethylhexylperoxydicarbonate as the polymerization initiator was pumped into the reactor to initiate polymerization. At the same time, the charge mixture was heated by warm water through the jacket to a preset polymerization temperature of 54° C. within 30 minutes. Thereafter, coolant water was passed through the jacket to remove heat of polymerization so that the preset temperature was maintained. The internal pressure of the reactor remained constant at 7.9 kgf/cm$^2$ for a long while and thereafter, started rapidly declining. When the internal pressure reached 7.4 kgf/cm$^2$ (146 minutes after the start of polymerization), the supply of the vinyl chloride monomer (VCM) into the reactor was restarted. The vinyl chloride monomer was continuously pumped to maintain the internal pressure at 7.4 kgf/cm$^2$. The flow rate of the vinyl chloride monomer was measured by a mass flow meter in the piping. When the flow rate accumulation reached 16.0 kg (109 minutes after the restart of monomer supply), the supply of the vinyl chloride monomer was interrupted. When the internal pressure of the reactor dropped to 5.5 kgf/cm$^2$ (26 minutes after the interruption of monomer supply), 4.5 grams of bisphenol-A was admitted to stop polymerization.

After the polymerization reaction was stopped, the unreacted monomer was recovered from the reactor and the resulting polymer slurry was taken out of the reactor, dewatered, and dried. The weight of the polymer was measured to calculate its yield based on the overall vinyl chloride monomer charge.

Example 2

A vinyl chloride polymer was prepared by the same procedure as in Example 1 except that the initial charge of VCM was 10 kg, the polymerization initiator used was 0.095% by weight based on the overall VCM charge of di-2-ethylhexylperoxydicarbonate, the preset polymerization temperature was 54.5° C., 20 kg of the VCM was continuously pumped to maintain the internal pressure at 7.5 kgf/cm$^2$, and polymerization was stopped when the internal pressure dropped to 5.6 kgf/cm$^2$.

Example 3

A vinyl chloride polymer was prepared by the same procedure as in Example 1 except that the initial charge of VCM was 20 kg, the polymerization initiators used were 0.045% by weight based on the overall VCM charge of di-2-ethylhexylperoxydicarbonate and 0.05% by weight based on the overall vinyl chloride monomer charge of tert-butylperoxyester, the preset polymerization temperature was 53° C., 10 kg of the VCM was continuously pumped to maintain the internal pressure at 7.2 kgf/cm$^2$, and polymerization was stopped when the internal pressure dropped to 5.3 kgf/cm$^2$.

Comparative Example 1

A vinyl chloride polymer was prepared by the same procedure as in Example 1 except that the initial charge of VCM was 30 kg, the polymerization initiator used was 0.12% by weight based on the overall VCM charge of di-2-ethylhexylperoxydicarbonate, the preset polymerization temperature was 50.5° C., no additional VCM was fed after the internal pressure of the reactor started declining, and polymerization was stopped when the internal pressure dropped to 4.9 kgf/cm$^2$.

Comparative Example 2

A vinyl chloride polymer was prepared by the same procedure as in Example 1 except that the initial charge of VCM was 26 kg, the polymerization initiator used was 0.122% by weight based on the overall VCM charge of di-2-ethylhexylperoxydicarbonate, the preset polymerization temperature was 51° C., 4 kg of the VCM was continuously pumped to maintain the internal pressure at 7.0 kgf/cm$^2$, and polymerization was stopped when the internal pressure dropped to 5.0 kgf/cm$^2$.

Comparative Example 3

A vinyl chloride polymer was prepared by the same procedure as in Comparative Example 1 except that the polymerization initiator used was 0.092% by weight based on the overall VCM charge of di-2-ethylhexylperoxydicarbonate, 0.037% by weight based on the overall VCM charge of diallyl maleate as a crosslinking agent was added at the same time as the polymerization initiator, the preset polymerization temperature was 54° C., and polymerization was stopped when the internal pressure dropped to 5.5 kgf/cm$^2$.

The vinyl chloride polymers obtained in Examples 1–3 and Comparative Examples 1–3 were measured for a degree of polymerization and tensile properties. The results are shown in Table 1.

Degree of Polymerization

It was measured according to JIS K6721.

Tensile Test

Tensile strength and elongation were measured by a tensile test according to JIS C3005. Using the tensile tester, Strograph manufactured by Toyo Seiki K.K., a No. 2 dumbbell-shaped specimen having a distance between gage marks of 25 mm and a width of 6 mm was tested at a pulling speed of 200 mm/min. An average of five measurements was reported.

The specimen was prepared by blending 100 parts by weight of the vinyl chloride polymer with 45 parts by weight of dioctyl phthalate, 5 parts by weight of tribasic lead sulfate, 2 parts by weight of dibasic lead phosphite, 10 parts by weight of calcined clay, and 0.5 part by weight of high-melting paraffin, followed by rolling and pressing. The rolling conditions included a 6-inch roll, a milling temperature of 165° C., a milling time of 5 minutes, and a gage of 0.8 mm. The pressing conditions included a 50-t press, a temperature of 170° C., a pressure of 110 kgf/cm$^2$, a preheating time of 5 minutes, and a pressing time of 3 minutes.

In Examples 1–3 and Comparative Examples 1–3, the lowest temperature of water passed through the jacket during polymerization was recorded to determine the load of heat removal.

TABLE 1

|  | E1 | E2 | E3 | CE1 | CE2 | CE3 |
|---|---|---|---|---|---|---|
| Polymerization temperature (°C.) | 54.0 | 54.5 | 53.0 | 50.5 | 51.0 | 54.0 |
| Initiator |  |  |  |  |  |  |
| Type* | EHP | EHP | EHP | EHP | EHP | EHP |
| Amount (%) | 0.090 | 0.095 | 0.045 | 0.120 | 0.122 | 0.092 |
| Type* | — | — | BND | — | — | — |
| Amount (%) | — | — | 0.050 | — | — | — |
| Crosslinking agent (%) | — | — | — | — | — | 0.037 |
| Initial charge of VCM (kg) | 14 | 10 | 20 | 30 | 26 | 30 |
| Additional charge of VCM (kg) | 16 | 20 | 10 | 0 | 4 | 0 |
| VCM supply pressure (kgf/cm$^2$) | 7.4 | 7.5 | 7.2 | — | 7.0 | — |
| Start of VCM supply (min.) | 146 | 117 | 156 | — | 230 | — |
| Time of VCM supply (min.) | 109 | 143 | 90 | — | 20 | — |
| Pressure dropping time (min.) | 26 | 24 | 35 | 38 | 34 | 35 |
| Total polymerization time (min.) | 281 | 284 | 281 | 283 | 284 | 283 |
| Final internal pressure (kgf/cm$^2$) | 5.5 | 5.6 | 5.3 | 4.9 | 5.0 | 5.5 |
| Yield (%) | 86.0 | 85.9 | 86.1 | 86.2 | 86.1 | 86.0 |
| Lowest jacket temperature (°C.) | 49.2 | 49.8 | 48.4 | 45.8 | 46.1 | 49.6 |
| Degree of polymerization | 1300 | 1310 | 1300 | 1300 | 1310 | 1300 |
| Tensile test |  |  |  |  |  |  |
| Tensile strength (kgf/mm$^2$) | 1.63 | 1.66 | 1.61 | 1.63 | 1.64 | 1.25 |
| Tensile elongation (%) | 388 | 380 | 391 | 375 | 382 | 345 |

*EHP: di-2-ethylhexylperoxydicarbonate (10-hour half-life temperature in 0.1 mol/l benzene solution: 43.5° C.)
BND: tert-butylperoxyneodecanoate (46.5° C.)

It is evident from Table 1 that as compared with the prior art, the polymers prepared by the process of the invention within an identical polymerization time had a high degree of polymerization although the amount of initiator used is reduced. The productivity is increased and the preset polymerization temperature can be higher. As a result, the load for heat removal is alleviated. The results of the tensile test on the inventive polymers are superior to those of the polymer whose degree of polymerization was increased by the use of a crosslinking agent (Comparative Example 3).

Example 4

The reactor used for suspension polymerization of vinyl chloride monomer (VCM) was a stainless steel reactor having an interior volume of 100 liters equipped with a jacket, baffle, and stirrer.

The reactor was charged with 60 kg of deionized water at 22° C. Then 2 kg of an aqueous solution containing 18 grams (0.06% by weight based on the overall vinyl chloride monomer charge) of water-soluble partially saponified polyvinyl alcohol and 12 grams (0.04% by weight based on the overall vinyl chloride monomer charge) of water-soluble cellulose ether and 100 grams of a mixture of water and methanol (in a weight ratio of 1:1) containing 12 grams (0.04% by weight based on the overall vinyl chloride monomer charge) of oil-soluble partially saponified polyvinyl alcohol as suspending agents were admitted into the reactor and stirred. By passing warm water through the jacket, the reactor contents were heated to 40° C. The reactor interior was evacuated to a vacuum of 120 mmHg. With stirring, the reactor was charged with 13.0 kg of vinyl chloride monomer (VCM) at room temperature to form a mixture. The charge mixture was heated to 40° C. by warm water through the jacket. Thereafter, 13.7 grams of an isoparaffin solution containing 9.6 grams (0.032% by weight based on the overall vinyl chloride monomer charge) of 1,1,2,2-tetramethylpropylperoxyneodecanoate as the polymerization initiator was pumped into the reactor to initiate polymerization. At the same time, the charge mixture was heated by warm water through the jacket to a preset polymerization temperature of 54° C. within 30 minutes. Thereafter, coolant water was passed through the jacket to remove heat of polymerization so that the preset temperature was maintained. The internal pressure of the reactor remained constant at 7.9 kgf/cm$^2$ for a long while and thereafter, started rapidly declining. When the internal pressure reached 7.4 kgf/cm$^2$ (121 minutes after the start of polymerization), the supply of the vinyl chloride monomer (VCM) into the reactor was restarted. The vinyl chloride monomer was continuously pumped to maintain the internal pressure at 7.4 kgf/cm$^2$. The flow rate of VCM was measured by a mass flow meter (model DO06S-HY-200 by Chiba Oval K.K.) in the piping. When the flow rate accumulation reached 17.0 kg (110 minutes after the restart of monomer supply), the supply of VCM was interrupted. When the internal pressure of the reactor dropped to 5.5 kgf/cm$^2$ (36 minutes after the interruption of monomer supply), 4.5 grams of bisphenol-A was admitted to stop polymerization.

After the polymerization reaction was stopped, the unreacted monomer was recovered from the reactor and the resulting polymer slurry was taken out of the reactor, dewatered, and dried. The weight of the polymer was measured to calculate its yield based on the overall vinyl chloride monomer charge.

Example 5

A vinyl chloride polymer was prepared by the same procedure as in Example 4 except that the initial charge of VCM was 10 kg, the polymerization initiator used was 0.037% by weight based on the overall VCM charge of 1,1,2,2-tetramethylpropylperoxypivalate, the preset polymerization temperature was 60° C., 20 kg of the VCM was continuously pumped to maintain the internal pressure at 8.2 kgf/cm$^2$, and polymerization was stopped when the internal pressure dropped to 6.5 kgf/cm$^2$.

Comparative Example 4

A vinyl chloride polymer was prepared by the same procedure as in Example 4 except that the initial charge of VCM was 30 kg, the polymerization initiator used was 0.027% by weight based on the overall VCM charge of tert-butylperoxyneodecanoate (equimolar to the 1,1,2,2-tetramethylpropylperoxyneodecanoate in Example 4), no additional VCM was supplied after the internal pressure of the reactor started declining, and polymerization was stopped when the internal pressure dropped to 6.7 kgf/cm$^2$.

Comparative Example 5

A vinyl chloride polymer was prepared by the same procedure as in Comparative Example 4 except that the polymerization initiator used was 0.039% by weight based on the overall VCM charge of di-2-ethylhexylperoxydicarbonate (equimolar to the 1,1,2,2-tetramethylpropylperoxyneodecanoate in Example 4), and polymerization was stopped when the internal pressure dropped to 6.0 kgf/cm$^2$.

Comparative Example 6

A vinyl chloride polymer was prepared by the same procedure as in Comparative Example 4 except that the polymerization initiator used was 0.032% by weight based on the overall VCM charge of 1,1,2,2-tetramethylpropylperoxyneodecanoate, and polymerization was stopped when the internal pressure dropped to 5.5 kgf/cm$^2$.

Comparative Example 7

A vinyl chloride polymer was prepared by the same procedure as in Comparative Example 4 except that the polymerization initiators used were 0.058% by weight based on the overall VCM charge of tert-butylperoxyneodecanoate and 0.03% by weight based on the overall VCM charge of cumylperoxyneodecanoate, and polymerization was stopped when the internal pressure dropped to 5.5 kgf/cm$^2$.

The vinyl chloride polymers obtained in Examples 4–5 and Comparative Examples 4–7 were determined for a degree of polymerization and initial coloring. The results are shown in Table 2.

Degree of Polymerization

It was measured according to JIS K6721.

Initial Coloring Test

With 100 parts by weight of a vinyl chloride polymer were blended 1 part by weight of tin laurate, 0.5 part by weight of a cadmium stabilizer, and 50 parts by weight of dioctyl phthalate. The blend was milled in a twin roll mill at 160° C. for 5 minutes and formed into a sheet of 0.8 mm thick. The sheet was cut into sections which were stacked one on top of the other. The stack was placed in a mold of 4×4×1.5 cm where it was heat compression molded at 160° C. and 65–70 kgf/cm$^2$ to form a sample. By analyzing the sample using a photoelectric colorimeter (manufactured by Nihon Denshoku Kogyo K.K.), a lightness index L and values of a and b in Hunter's color difference equation were determined as prescribed in JIS Z8730 (1980).

The samples were rated in four classes of excellent (Exc.), good, fair, and poor.

TABLE 2

|  | E4 | CE4 | CE5 | CE6 | CE7 | E5 |
|---|---|---|---|---|---|---|
| Polymerization temperature (°C.) | 54.0 | 54.0 | 54.0 | 54.0 | 54.0 | 60.0 |
| Initiator |  |  |  |  |  |  |
| Type* | TMND | BND | EHP | TMND | BND | TMPV |
| Amount (%) | 0.032 | 0.027 | 0.039 | 0.032 | 0.058 | 0.037 |
| Type* | — | — | — | — | CND | — |
| Amount (%) | — | — | — | — | 0.030 | — |
| Initial charge of VCM (kg) | 13 | 30 | 30 | 30 | 30 | 10 |
| Additional charge of VCM (kg) | 17 | 0 | 0 | 0 | 0 | 20 |
| VCM supply pressure (kgf/cm$^2$) | 7.4 | — | — | — | — | 8.2 |
| Start of VCM supply (min.) | 115 | — | — | — | — | 93 |
| Time of VCM supply (min.) | 120 | — | — | — | — | 115 |
| Pressure dropping time (min.) | 32 | 70 | 70 | 28 | 45 | 24 |
| Total polymerization time (min.) | 267 | 585 | 469 | 420 | 269 | 232 |
| Final internal pressure (kgf/cm$^2$) | 5.5 | 6.7 | 6.0 | 5.5 | 5.5 | 6.5 |
| Yield (%) | 86.0 | 81.1 | 84.1 | 86.0 | 86.0 | 86.1 |
| Degree of polymerization | 1310 | 1150 | 1140 | 1150 | 1150 | 1030 |
| Initial coloring |  |  |  |  |  |  |
| L | 71.2 | 70.6 | 68.7 | 70.7 | 70.1 | 70.8 |
| a value | −1.5 | −1.2 | −1.3 | −1.2 | −1.2 | −1.4 |
| b value | 10.6 | 10.8 | 13.3 | 10.9 | 11.8 | 10.9 |
| Rating | Exc. | Exc. | Poor | Exc. | Good | Exc. |

*TMND: 1,1,2,2-tetramethylpropylperoxyneodecanoate (10-hour half-life temperature in 0.1 mol/l benzene solution: 39.0° C.)
TMPV: 1,1,2,2-tetramethylpropylperoxypivalate (45.7° C.)
BND: tert-butylperoxyneodecanoate (46.5° C.)
EHP: di-2-ethylhexylperoxydicarbonate (43.5° C.)
CND: cumylperoxyneodecanoate (36.6° C.)

It is evident from Table 2 that as compared with the prior art, the process of the invention permits a polymer to be produced within a short time of polymerization reaction with a significantly small amount of initiator used. The polymer is improved in colorability upon molding and has a high degree of polymerization. The load of heat removal is reduced.

Japanese Patent Application Nos. 192431/1995 and 282604/1995 are incorporated herein by reference.

Although some preferred embodiments have been described, many modifications and variations may be made thereto in the light of the above teachings. It is therefore to be understood that within the scope of the appended claims, the invention may be practiced otherwise than as specifically described.

We claim:

1. A process for preparing a vinyl chloride polymer by suspension polymerization of a vinyl chloride monomer in the presence of a polymerization initiator in a reactor, comprising the steps of:

charging the reactor with 1/10 to 2/3 of the overall monomer charge, initiating polymerization, and feeding the remainder of the overall monomer charge to the reactor after the internal pressure of the reactor has started declining, thereby continuing polymerization, and wherein the polymerization is carried out under a certain saturated vapor pressure of P1 kgf/cm² at a preset polymerization temperature, when the internal pressure of the reactor declines to P2 kgf/cm², the remainder of the overall monomer charge is continuously fed to the reactor so as to maintain the internal pressure within the range of (P1–ΔP) wherein ΔP=P1–P2 ranges from 0.1 to 2.0 kgf/cm².

2. The process of claim 1 wherein a polymerization initiator having a temperature of 30° to 65° C. at which its half life in a 0.1 mol/l benzene solution is 10 hours is used in an amount of 0.01 to 0.3% by weight based on the weight of the overall monomer charge.

3. The process of claim 2 wherein the polymerization initiator is a 1,1,2,2-tetramethylpropylperoxy ester of the following general formula:

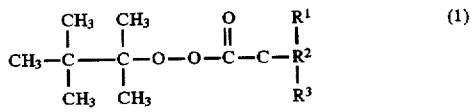

wherein $R^1$, $R^2$ and $R^3$ are independently selected from normal alkyl groups having 1 to 9 carbon atoms.

4. The process of claim 1 wherein Δp=P1–P2 ranges from 0.1 to 1.0 kgf/cm².

* * * * *